United States Patent [19]

Szostak

[11] 4,372,703
[45] Feb. 8, 1983

[54] TAPERED SCREW FASTENING MEANS FOR BUSHINGS, SLEEVES AND BEARINGS

[75] Inventor: Jan Szostak, Lincroft, N.J.

[73] Assignee: The Singer Company, Stamford, Conn.

[21] Appl. No.: 224,245

[22] Filed: Jan. 12, 1981

[51] Int. Cl.³ .................. B25G 3/18; F16B 21/00; F16D 1/00
[52] U.S. Cl. .................. 403/324; 403/378; 403/374; 403/409; 403/362
[58] Field of Search ............. 403/324, 378, 379, 374, 403/369, 409, 230, 231, 161, 362

[56] References Cited

U.S. PATENT DOCUMENTS

| | | |
|---|---|---|
| 181,884 | 9/1876 | Welch .................. 213/175 |
| 321,635 | 7/1885 | Palmer . |
| 390,583 | 10/1888 | Frey . |
| 974,156 | 11/1910 | Jones . |
| 1,191,313 | 7/1916 | Johnston . |
| 2,547,789 | 4/1951 | Skeel . |
| 2,691,541 | 10/1954 | Benedek . |
| 2,974,965 | 3/1961 | Welles .................. 403/378 X |
| 3,720,429 | 3/1973 | Friedrichs et al. . |
| 3,796,464 | 3/1974 | Hansen et al. .................. 403/378 X |
| 3,958,888 | 5/1976 | Mullenberg . |
| 3,972,636 | 8/1976 | Peter et al. . |
| 3,995,824 | 12/1976 | Bauer . |
| 3,998,563 | 12/1976 | Kloren . |
| 4,045,927 | 9/1977 | Diaz .................. 403/409 X |

*Primary Examiner*—Wayne L. Shedd
*Attorney, Agent, or Firm*—William V. Ebs; Robert E. Smith; Edward L. Bell

[57] ABSTRACT

A bushing, sleeve, bearing or like part is secured in a structural member with a clamping device which is screwed into the structural member at right angles to said part to cause a tapered portion of the device converging toward terminating a reduced diameter material end portion to forcibly engage the said part.

12 Claims, 6 Drawing Figures

TAPERED SCREW FASTENING MEANS FOR BUSHINGS, SLEEVES AND BEARINGS

BACKGROUND OF THE INVENTION

1. Field of the Invention

The invention relates to clamping arrangements for bushings, sleeves, bearings and the like.

2. Description of the Prior Art

Claming arrangements for securing bushings, sleeves, bearings and the like in fixed structures commonly utilize various devices in concert such as screws, clamping rings, sleeves and variously shaped wedging elements. Because of the number of parts and the use of specially shaped pieces, these arrangements are unduly costly. Furthermore, a considerable amount of time is often required for their assembly, and it isn't unusual for the clamping pieces to work loose after rather short periods of time and so lose their effectiveness.

It is a prime object of the present invention to provide an improved clamping device which can be inexpensively produced utilizing conventional machining techniques, and which can easily be adjustably positioned in a fixed member to secure a bushing, sleeve, bearing or the like thereto.

It is another object of the invention to provide an improved, adjustable clamping arrangement consisting of a few easily produced, easily assembled, self-locking parts with which a bushing, sleeve, bearing or the like can be effectively secured in a fixed member.

It is still another object of the invention to provide a self-tapping, locking clamping device with which a bushing, sleeve, bearing or the like can be reliably secured against movement in a fixed member.

Other objects and advantages of the invention will become apparent during a reading of the specification taken in connection with the accompanying drawings.

SUMMARY OF THE INVENTION

A clamping arrangement in accordance with the invention for a bushing, sleeve, bearing or like part which is supported in structural member includes a through hole extending in the structural member at right angles to the longitudinal axis of the supported part and disposed so that a surface portion of the said part extends into the hole. Such arrangement further includes a threaded clamping device with a terminating reduced diameter material entering end portion, an opposite head end portion adapted to receive a tool for applying a turning torque thereto effective to advance the device in the hole, and a tapered intermediate portion which is converging in a direction extending from the head end portion to the material entering end portion and which is forced against the supported part by the advance of the device to cause a holding force dependent upon the adjusted position of the device to be applied to the supported part.

DESCRIPTION OF THE PREFERRED EMBODIMENTS OF THE INVENTION

Figure 1:
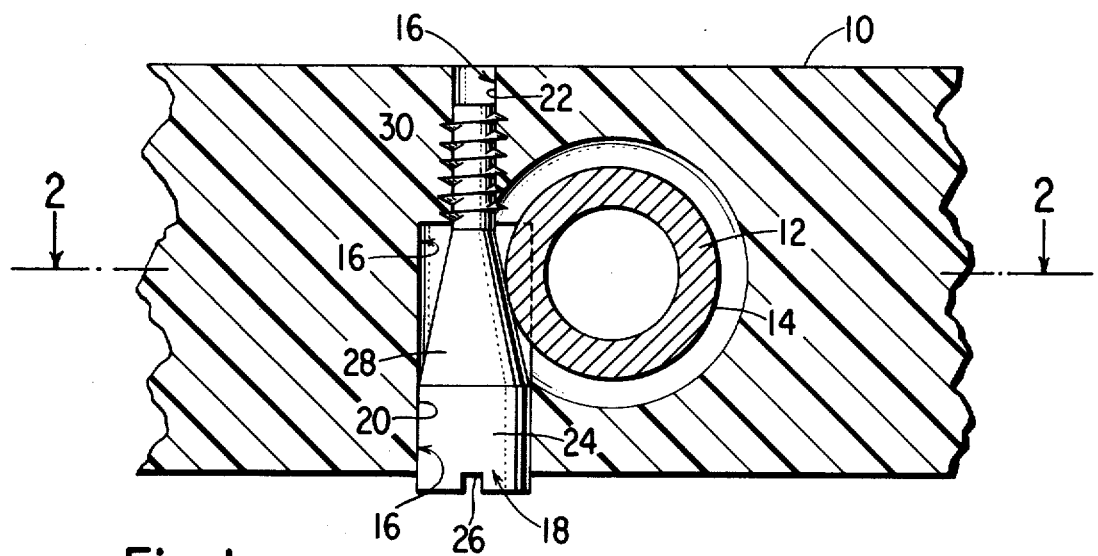
FIG. 1 is a cross-sectional view taken through a bushing and showing a clamping arrangement therefor in accordance with the invention.
Figure 2:
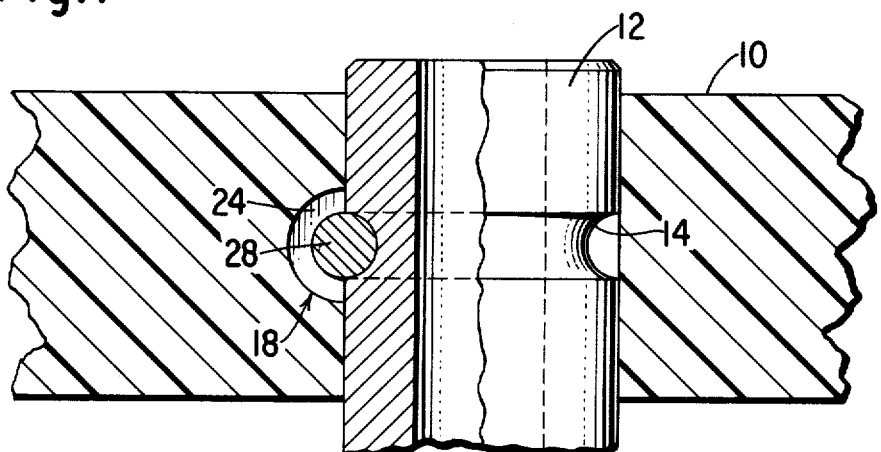
FIG. 2 is a sectional view taken on the plane of the line 2—2 of FIG. 1.

Referring to FIGS. 1 and 2, reference character 10 designates a structural member which is shown as being of plastic, but which may also be of metal such as aluminum or zinc, and wherein there is supported a bushing 12. As shown, the bushing includes an annular groove 14 in the outer surface. Structural member 10 is provided with a through hole 16 extending at right angles relative to the direction in which the bushing extends in member 10. Hole 16 is adapted to receive a tapered clamping device 18 and is for such purpose provided with enlarged and reduced diameter opposite end portions 20 and 22, respectively. The tapered clamping device 18 includes a head end portion 24 with a slot 26 for a screwdriver, an intermediate tapered portion 28, and a material entering self-tapping threaded end portion 30. The self-tapping threaded end portion of the device is screwed into reduced diameter end portion 22 of the hole 16 with a screwdriver to advance the device in the hole and cause the tapered portion 28 of the device to forcibly engage the bushing 12 in annular groove 14 with a clamping force dependent upon the magnitude of the applied torque. The clamping force serves to prevent rotational and axial movements of the bushing 12 in structural member 10. The presence of tapered portion 28 of clamping device 18 in groove 14 locates the bushing longitudinally in member 10.

Figure 3:
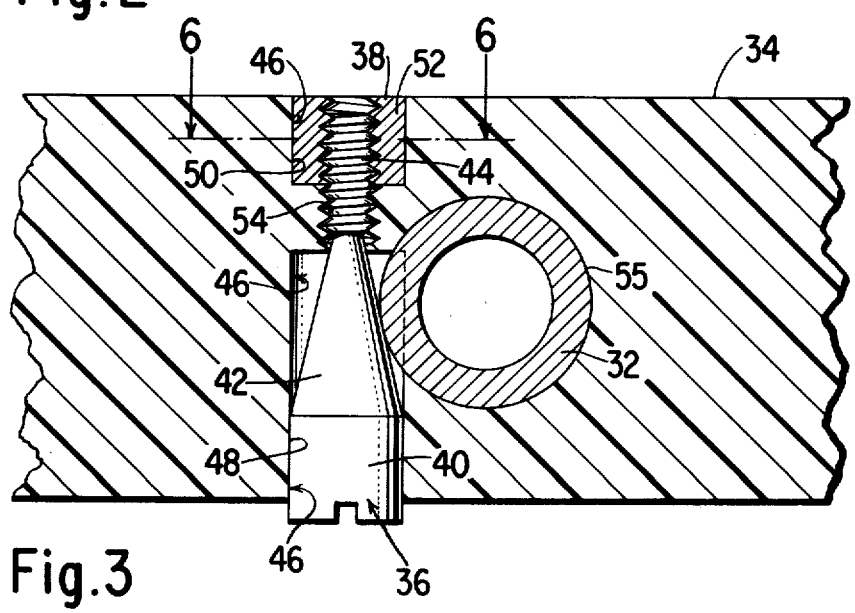
FIGS. 3, 4 and 5 are views similar to FIG. 1 showing other forms of the clamping arrangement.
Figure 6:
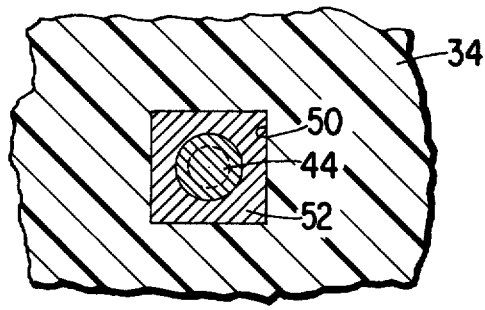
FIG. 6 is a sectional view taken on the plane of the line 6—6 of FIG. 3.

In FIG. 3, there is shown a bushing 32 supported in a structural member 34, and a clamping device 36 which is used in combination with a locking member 38 to securely affix the bushing in the structural member. Clamping device 36 is generally similar to the clamping device 18 already described in being formed with a head end portion 40, a tapered intermediate portion 42, and a threaded material entering end portion 44. As shown, structural member 34 includes a through hole 46 which extends at right angles with respect to the direction in which the bushing extends im member 34. The hole 46 includes an enlarged end portion 48 into which portions 40 and 42 of the clamping device extend, an enlarged opposite end portion 50 wherein an internally threaded locking member 52 is received, and a threaded reduced intermediate portion 54. End portion 50 of the hole 34 and locking member 52 may be square in cross-section as illustrated in FIG. 6, or hexagonal, or have any other polygonal configuration effective to prevent the locking member from turning in structural member 10. The clamping device 36 is turned in hole 34 to screw threaded end portion 44 of the device into the locking member 52 in hole portion 50. The intermediate portion 42 of device 36 is thereby brought to bear against the surface 55 of bushing 32, and at the same time member 52 is drawn tightly against the bottom surface 54 of portion 50 of hole 34 to lock the clamping device in a selected position effective to hold bushing 32 against movement in structural member 34.

Figure 4:
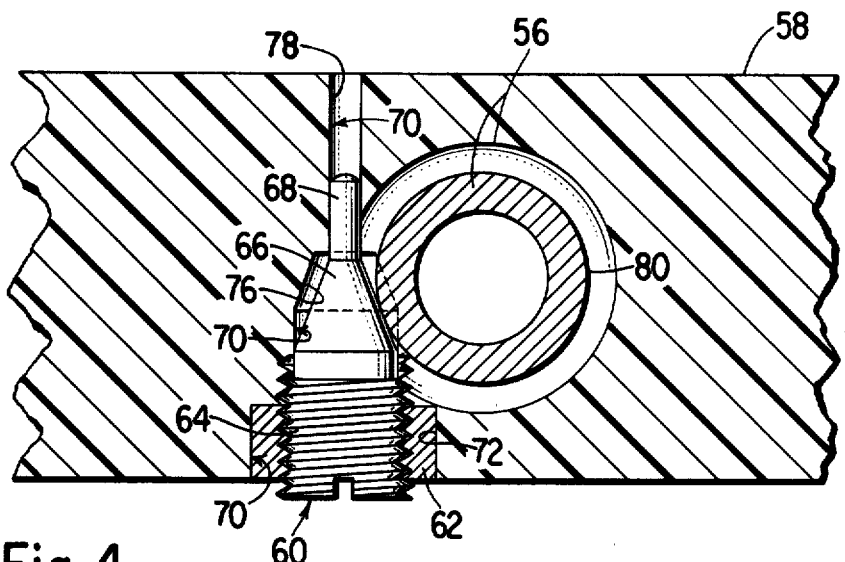

Referring to FIG. 4, there may be seen a bushing 56 in a structural member 58, and a clamping devie 60 used in conjunction with an internally threaded locking member 62 to affix the bushing 56 in the member 58. Clamping device 60 is provided with a threaded head end portion 64, a tapered intermediate portion 66, and a pilot material entering end portion 68. Reference character 70 designates a hole extending through structural member 58 at right angles relative to the direction of the bushing in the structural member. The hole includes enlarged end portion 72 wherein there is disposed internally threaded locking member 62. The hole further includes a tapered portion 76 and reduced diameter end portion 78. The end portion 68 of clamping device 60 is received in reduced diameter hole portion 78 which serves as a guide for the device. Tapered portion 66 of the clamping device registers in an intermediate portion of the hole including tapered portion 76 and is caused to forcibly engage the bushing 56 in a locating groove 80 as head end portion 64 of the clamping device is screwed into locking member 62.

Figure 5:
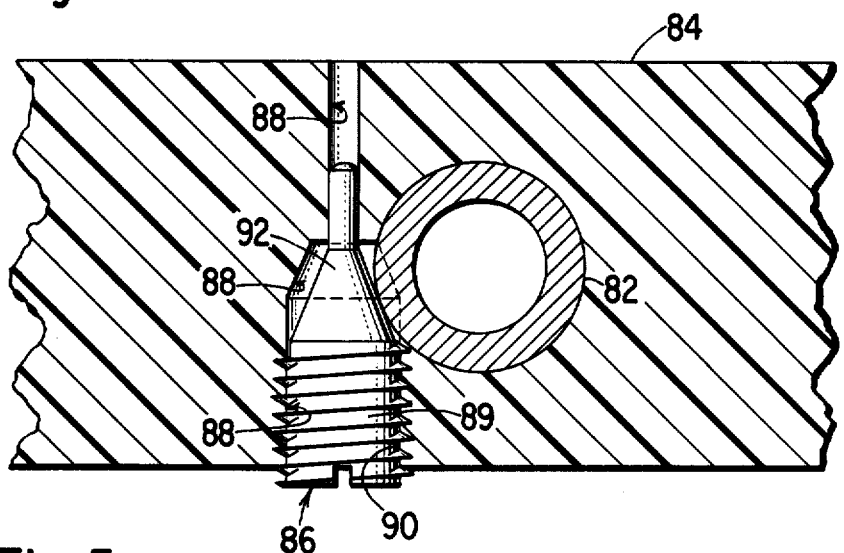

In FIG. 5, there is shown a bushing 82 without a locating groove secured in a structural member 84 by clamping device 86 located in hole 88 extending through member 84 at right angles to the bushing. The clamping device 86 is generally similar to clamping device 60 of FIG. 4, but has a coarsely threaded self-tapping head end portion 89 which is screwed directly into the enlarged end 90 of hole 88 to cause an intermediate tapered portion 92 of the device in portion 94 of the hole to act against the bushing 82 as the device is guided by pilot end portion 96 in reduced diameter end portion 98 of the hole.

In each of the arrangements shown in the various figures of the drawings, the structural member in which the bushing is supported may be plastic as illustrated, or it may be of a metal such as aluminum or zinc. The locking members 52 and 62 of FIGS. 3 and 4 are preferably metal as shown, but can also be plastic. The use of a locking member in connection with a clamping device as described herein has a special advantage when the structural member in which the clamping device is used is plastic because the locking member becomes effective to securely hold the clamping device with the application of only a moderate torque thereto and so avoids damage to a plastic structural member.

Locking members 52 and 62 may be formed as separate parts away from the structural members 34 and 58, and then inserted in the structural members for threaded engagement with the clamping device which is screwed into the locking member while the locking member is held in place in the space provided for it in the structural member. If the structural member is metal, the locking device may be molded of plastic in the structural member and then drilled and tapped in place.

While the present disclosure is of preferred embodiments of the invention, it is for purposes of illustration only, and is not to be construed as a limitation of the invention. Numerous alterations and modifications of the structures herein disclosed will suggest themselves to those skilled in the art, and all such modifications and alterations which do not depart from the spirit and scope of the invention are intended to be included within the scope of the appended claims.

I claim:

1. A clamping arrangement for a wall encircled cylindrical bushing, sleeve, bearing or like part which is supported in a structural member against movement in directions perpendicular to the longitudinal axis of the part, said arrangement including a hole in the structural member located to one side of the longitudinal axis of the supported part and extending perpendicularly in a non-radial direction relative to said axis, the hole being so disposed that a portion of the wall of said part projects into said hole; and a threaded clamping device in said hole including a material entering end portion, an opposite head end portion adapted to receive a tool for applying a turning torque thereto effective to advance the device in said hole, and a tapered intermediate portion which is converging in a direction extending from the head end portion to the material entering end portion and which is forced against said projecting wall portion of the supported part by the advance of the device to prevent movement of the supported part in said structural member.

2. A clamping arrangement according to claim 1 wherein the clamping device is threaded on one of the end portions, the opposite end portion is smooth and untapered, and said opposite end portion has all-around surface to surface contact with the structural member in the hole for guiding movement of the device therein.

3. A clamping arrangement according to claim 1 wherein the clamping device is threaded on the material entering end portion with self-tapping threads and the structural member includes threads formed and engaged by the said threads on the material entering end portion of the clamping device.

4. A clamping arrangement according to claim 1 wherein the clamping device is threaded on the head end portion with self-tapping threads and the structural member includes threads formed and engaged by the said threads on the head end portion of the clamping device.

5. A clamping arrangement according to claim 1 wherein the clamping device is threaded on one of the end portions and the structural member includes a locking member in said hole with threads which are engaged by the threaded end portion of the clamping device.

6. A clamping arrangement according to claim 5 wherein the locking member is an independently formed part which is inserted in the hole in the structural member.

7. A clamping arrangement according to claim 5 wherein the locking member in the hole in the structural member is a molded-in-place part.

8. A clamping arrangement according to claim 5 wherein the locking member is many sided and the hole is adapted to engage the locking member sides and thereby prevent the locking member from turning in the hole.

9. A clamping arrangement according to claim 1 wherein the clamping device is threaded on the material entering end portion and the structural member includes a locking member in said hole with threads which are engaged by the said threaded material end portion of the clamping device.

10. A clamping arrangement according to claim 1 wherein the clamping device is threaded on the head end portion and the structural member includes a locking member in said hole with threads which are engaged by the said threaded head end portion of the clamping device.

11. A clamping arrangement according to claim 1 in which the supported part includes a locating groove wherein the tapered portion of the clamping device is received.

12. A clamping arrangement according to claim 11 in which the locating groove extends completely around the supported part and applies a clamping force to the supported part.

* * * * *